(12) United States Patent
Monfette (10) Patent No.: US 10,323,454 B2
(45) Date of Patent: Jun. 18, 2019

(54) PASSIVE SYSTEM AND METHOD FOR VENTING AND REDUCING MOISTURE WITHIN A WINDOW CAVITY

(71) Applicant: BOMBARDIER INC., Dorval (CA)

(72) Inventor: Stephane Monfette, Lachine (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 15/761,282

(22) PCT Filed: Sep. 20, 2016

(86) PCT No.: PCT/IB2016/055607
§ 371 (c)(1),
(2) Date: Mar. 19, 2018

(87) PCT Pub. No.: WO2017/051313
PCT Pub. Date: Mar. 30, 2017

(65) Prior Publication Data
US 2018/0266170 A1      Sep. 20, 2018

Related U.S. Application Data

(60) Provisional application No. 62/221,747, filed on Sep. 22, 2015.

(51) Int. Cl.
*E06B 3/677* (2006.01)
*B64C 1/14* (2006.01)
(Continued)

(52) U.S. Cl.
CPC ............... *E06B 3/677* (2013.01); *B64C 1/14* (2013.01); *E06B 7/02* (2013.01); *E06B 7/12* (2013.01); *E06B 2007/026* (2013.01)

(58) Field of Classification Search
CPC ... E06B 3/677; E06B 7/12; E06B 7/02; E06B 2007/026; B64C 1/14
(Continued)

(56) References Cited

U.S. PATENT DOCUMENTS 2,159,661 A     5/1939   Knudsen
2,359,163 A *   9/1944   Sherts ............... B32B 17/10036
                                                           156/99
(Continued)

FOREIGN PATENT DOCUMENTS

DE          933371 C      9/1955
DE          19806108 A1   8/1999
(Continued)

OTHER PUBLICATIONS

FR 2 394 728, machine translation (Year: 2018).*
(Continued)

*Primary Examiner* — Brent W Herring
(74) *Attorney, Agent, or Firm* — Norton Rose Fulbright Canada LLP (57) ABSTRACT

A window system for an enclosure subjected to a change in air pressure, the enclosure having a window having an air-filled cavity, the system including a first path configured to allow air within the cavity of the window to vent out of the cavity, a second path configured to allow air to flow into the cavity, and a drying agent disposed within the second path, where moisture in the air entering the window cavity through the second path is reduced by the drying agent.

12 Claims, 5 Drawing Sheets

(51) Int. Cl.
*E06B 7/02* (2006.01)
*E06B 7/12* (2006.01)

(58) Field of Classification Search
USPC .............. 52/209, 204.593, 786.1; 244/129.3
See application file for complete search history.

(56) References Cited

U.S. PATENT DOCUMENTS

| | | | | |
|---|---|---|---|---|
| 3,604,163 | A * | 9/1971 | McCurdy | E06B 3/677 52/172 |
| 4,065,894 | A | 1/1978 | Day | |
| 4,952,430 | A * | 8/1990 | Bowser | E06B 3/677 428/192 |
| 5,884,865 | A | 3/1999 | Scherer et al. | |
| 5,988,566 | A | 11/1999 | Meyer | |
| 6,168,112 | B1 | 1/2001 | Mueller et al. | |
| 6,756,126 | B2 * | 6/2004 | Oguri | B64C 1/1492 427/317 |
| 6,938,858 | B1 * | 9/2005 | Schneider | B64G 1/12 244/129.3 |
| 7,174,692 | B1 * | 2/2007 | Vickers | E06B 5/12 109/5 |
| 7,927,402 | B1 | 4/2011 | Grzeslak et al. | |
| 7,997,037 | B2 * | 8/2011 | Crandell | E06B 3/24 52/172 |
| 8,070,854 | B2 | 12/2011 | Grzeslak et al. | |
| 8,099,916 | B2 * | 1/2012 | Joasil | E06B 7/02 454/122 |
| 8,181,400 | B2 * | 5/2012 | Kindschuh | E06B 3/677 52/171.3 |
| 8,316,596 | B2 * | 11/2012 | Anderson | E06B 3/677 52/204.62 |
| 8,988,294 | B2 | 3/2015 | Voss et al. | |
| 9,428,260 | B2 * | 8/2016 | Chaumel | B64C 1/1492 |
| 10,041,849 | B2 * | 8/2018 | Knijnenburg | G01L 13/06 |
| 2003/0049462 | A1 * | 3/2003 | Oguri | B64C 1/1492 428/429 |
| 2004/0188124 | A1 * | 9/2004 | Stark | B81B 7/0067 174/535 |
| 2005/0034386 | A1 * | 2/2005 | Crandell | E06B 3/24 52/204.5 |
| 2005/0132558 | A1 * | 6/2005 | Hennessy | E06B 3/677 29/525 |
| 2006/0065345 | A1 * | 3/2006 | James | B21D 53/74 156/64 |
| 2006/0191215 | A1 * | 8/2006 | Stark | C03C 27/08 52/204.6 |
| 2007/0033887 | A1 * | 2/2007 | Ambrose | E06B 3/677 52/171.3 |
| 2008/0104900 | A1 * | 5/2008 | Joasil | E06B 3/677 52/171.3 |
| 2009/0031659 | A1 * | 2/2009 | Kalfon | E04B 1/803 52/404.1 |
| 2010/0287851 | A1 * | 11/2010 | Kindschuh | E06B 3/677 52/171.3 |
| 2011/0061319 | A1 * | 3/2011 | Anderson | E06B 3/677 52/204.52 |
| 2011/0133940 | A1 * | 6/2011 | Margalit | E06B 3/66366 340/584 |
| 2012/0325344 | A1 * | 12/2012 | Chaumel | B64C 1/1492 137/557 |
| 2013/0168495 | A1 | 7/2013 | Mueller et al. | |
| 2015/0322708 | A1 * | 11/2015 | Kotowski | E06B 3/677 52/172 |
| 2016/0061680 | A1 * | 3/2016 | Knijnenburg | G01L 13/06 73/753 |
| 2017/0328121 | A1 * | 11/2017 | Purdy | E06B 3/6612 |
| 2018/0045118 | A1 * | 2/2018 | Coretto | F02C 7/232 |
| 2018/0178895 | A1 * | 6/2018 | Desroches | B64C 1/1492 |
| 2018/0195339 | A1 * | 7/2018 | Kuster | E06B 3/6675 |

FOREIGN PATENT DOCUMENTS

| | | |
|---|---|---|
| EP | 846616 A2 | 6/1998 |
| EP | 1970525 A2 | 9/2008 |
| FR | 2394728 A1 | 1/1979 |
| GB | 2225368 A | 5/1990 |

OTHER PUBLICATIONS

EP 1 970 525, machine translation (Year: 2018).*
PCT international Search Report and Written Opinion dated Nov. 21, 2016 re: International Application No. PCT/IB2016/055607.
English translation of European patent document No. 1970525 dated Sep. 17, 2008, https://www63.orbit.com/?locale=en&ticket=5fb14932-446d-4b2b-b2cd-bac1f78170cb&embedded=false#PatentDocumentPage, accessed on Feb. 22, 2018.
English translation of German patent document No. DE19806108 dated Aug. 26, 1999, https://patents.google.com/patent/DE19806108A1/en?oq=DE19806108, accessed on Feb. 22, 2018.
English translation of European patent document No. EP0846616 dated Jun. 10, 1998, https://patents.google.com/patent/EP0846616A2/en?oq=EP0846616, accessed on Feb. 22, 2018.
English abstract of France patent document No. FR2394728 dated Jan. 12, 1979, https://patents.google.com/patent/FR2394728A1/en?oq=FR2394728, accessed on Feb. 22, 2018.
DeHavilland Reference, Window dry air system / Window Panel Installation. 1963.

* cited by examiner

PASSIVE SYSTEM AND METHOD FOR VENTING AND REDUCING MOISTURE WITHIN A WINDOW CAVITY

CROSS-REFERENCE TO RELATED APPLICATION(S)

The present application is a national phase application under 35 U.S.C. 371 of International Patent Application No. PCT/IB2016/055607 filed on Sep. 20, 2016, which claims priority from U.S. Provisional Patent Application Ser. No. 62/221,747 filed on Sep. 22, 2015, the entire content of which is incorporated herein by reference.

TECHNICAL FIELD

The invention relates to aerospace vehicles and, more particularly, to a system and method for passively venting window cavities of aerospace vehicles in a manner that reduces a moisture content within such cavities in order to minimize the formation of fog or frost.

BACKGROUND

Certain types of vehicles and other enclosures subject to air pressure changes include window arrangements having air disposed within an interspace of the window construction. As air pressure within the vehicle or enclosure decreases, the air within the interspace is drawn out and directed into the body of the enclosure. As pressure increases within the body of the enclosure air therein expands and moves back into the window interspace to equalize pressure. Such transfer of air within the interspace can result in varying levels of absolute humidity within the interspace. If the temperature of the window arrangement is reduced to or below the dew point, then fog and/or frost can rapidly form on panes of the window arrangement.

This problem is particularly evident in aircraft which include numerous windows, each having one or more air cavities which are in fluidic communication with the internal cabin air. These cavities can be delimited by various panes of the window or by a window pane and the inner most window reveal layer arranged most proximate to the passengers. Aircraft window cavities must be vented to the cabin in order to allow for pressure regularization during flight. As the aircraft ascends, cabin pressure reduces, and thus air is vented out of the window cavities in order to stabilize internal air pressure levels. Similarly, when the aircraft descends, cabin pressure increases, and air migrates back into the window cavities. Moisture levels in in cabin air can increase during flight, for example, due to the number of passengers on board, or the use of humidifiers, and/or showers and other bathroom facilities during flight. When this moist air passes back into the window cavities, for example, during a decrease in altitude, fog and/or frost can rapidly form within the window arrangement. This can negatively affect passenger comfort in that views are obscured and can even present a safety hazard when certain flight conditions require clear window visibility.

The occurrence of moisture collection is particularly evident in modern aircraft which have larger windows resulting in larger window cavities that contain an increased volume of potentially moisture laden air. Additionally, these larger modern aircraft windows are often thinner in cross-section, and are thus more sensitive to external temperature. During ascent of the aircraft, these windows cool quickly thus rapidly reaching the dew point, such that traditional moisture control provisions are unable to effectively prevent the development of fog or frost.

Some existing systems involve heating the windows to prevent condensation, while others utilize ant-fog coatings. Heated systems can be high in power consumption, can add unnecessary weight and complexity to the aircraft, and can affect passenger comfort through heat exposure. Anti-fog coatings are newer and hence unproven and limited data is available regarding their reliability. Both of these systems add additional cost to the aircraft.

Thus, a system and a method is required that effectively controls moisture within air cavities of aircraft windows and which is simple, lightweight, low cost, easy to maintain, and does not disturb the comfort of passengers.

BRIEF SUMMARY

A window system for an enclosure subjected to a change in air pressure is disclosed, the enclosure having a window with an air-filled cavity, the system including a first path configured to allow air within the cavity of the window to vent out of the cavity, a second path configured to allow air to flow into the cavity, and a drying agent disposed within the second path, where moisture in the air entering the window cavity through the second path is reduced by the drying agent.

The first path may include a flow control element which permits airflow out of the system and prohibits airflow into the system.

The second path may include a flow control element which permits airflow into the system and prohibits airflow out of the system.

The flow control elements may comprise one-way valves.
The drying agent may comprise a desiccant material.
The enclosure may be an aerospace vehicle.
The aerospace vehicle may be an aircraft.
The system may comprise:
a third path disposed between the window cavity and the first and second paths;
a junction disposed at an interface where the third path connects with the first and second paths; and
a connection to the window cavity disposed on the third path opposite from the junction;
wherein the third path is configured to allow airflow into the window cavity and out of the window cavity.

The connection may comprise a first conduit and a second conduit separate from the first, wherein the first and second conduits extend from the third path to the window cavity and are configured to allow airflow into the window cavity and out of the window cavity.

The first path may include a one-way valve which permits airflow out of the system and prohibits airflow into the system and the second path may include a one-way valve which permits airflow into the system and prohibits airflow out of the system.

The enclosure may be an aircraft including a plurality of said windows each having said window cavity. The third path may extend through an outer wall of the aircraft past the plurality of windows. The connection may comprise a conduit extending from each of the window cavities to the third path.

The first path may include a one-way valve which permits airflow out of the system and prohibits airflow into the system and the second path may include a one-way valve which permits airflow into the system and prohibits airflow out of the system.

The first path may be configured to allow air within the cavity of the window to vent out of the cavity when the air pressure within the enclosure decreases and the second path may be configured to allow air to flow into the cavity when the air pressure in the enclosure increases.

The first path may be further configured to prevent airflow out of the window cavity from entering the drying agent and the second path may be further configured to direct all airflow into the cavity to pass through the drying agent.

The drying agent may comprise a desiccant material configured to remove moisture from the airflow into the cavity and to lower the absolute humidity and dew point thereof.

Embodiments may include combinations of the above features.

Also disclosed is an aircraft comprising a system as disclosed herein.

Also disclosed herein is a method for venting a window cavity of an enclosure subjected to a change in air pressure, the method including directing airflow through a first path out of the cavity during a decrease in air pressure within the enclosure, directing airflow through a second path into the cavity during an increase in air pressure within the enclosure, and removing moisture from the airflow in the second path.

The method may comprise:
prohibiting airflow into the window cavity through the first path; and
prohibiting airflow out of the window cavity through the second path.

The moisture may be removed from the airflow in the second path by a desiccant material through which the airflow into the cavity passes.

The method may comprise directing the airflow out of the window cavity and the airflow into the window cavity through a third path extending between the window cavity and the first and second paths.

The method may comprise:
prohibiting airflow into the window cavity through the first path; and
prohibiting airflow out of the window cavity through the second path;
wherein the enclosure comprises an aircraft;
wherein the decrease in air pressure within the aircraft coincides with an increase in an altitude of the aircraft; and
wherein the increase in air pressure within the aircraft coincides with a decrease in the altitude of the aircraft.

Embodiments may include combinations of the above features.

Details of these and other aspects of the subject matter of this application will be apparent from the detailed description and drawings included below.

BRIEF DESCRIPTION OF THE DRAWINGS

The various embodiments of the present disclosure can be understood with reference to the following drawings. The components are not necessarily to scale.

Also, in the drawings, like reference numerals designate corresponding parts throughout the several views.

DETAILED DESCRIPTION

The present disclosure is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of calculating and/or storing the value.

Figure 1:
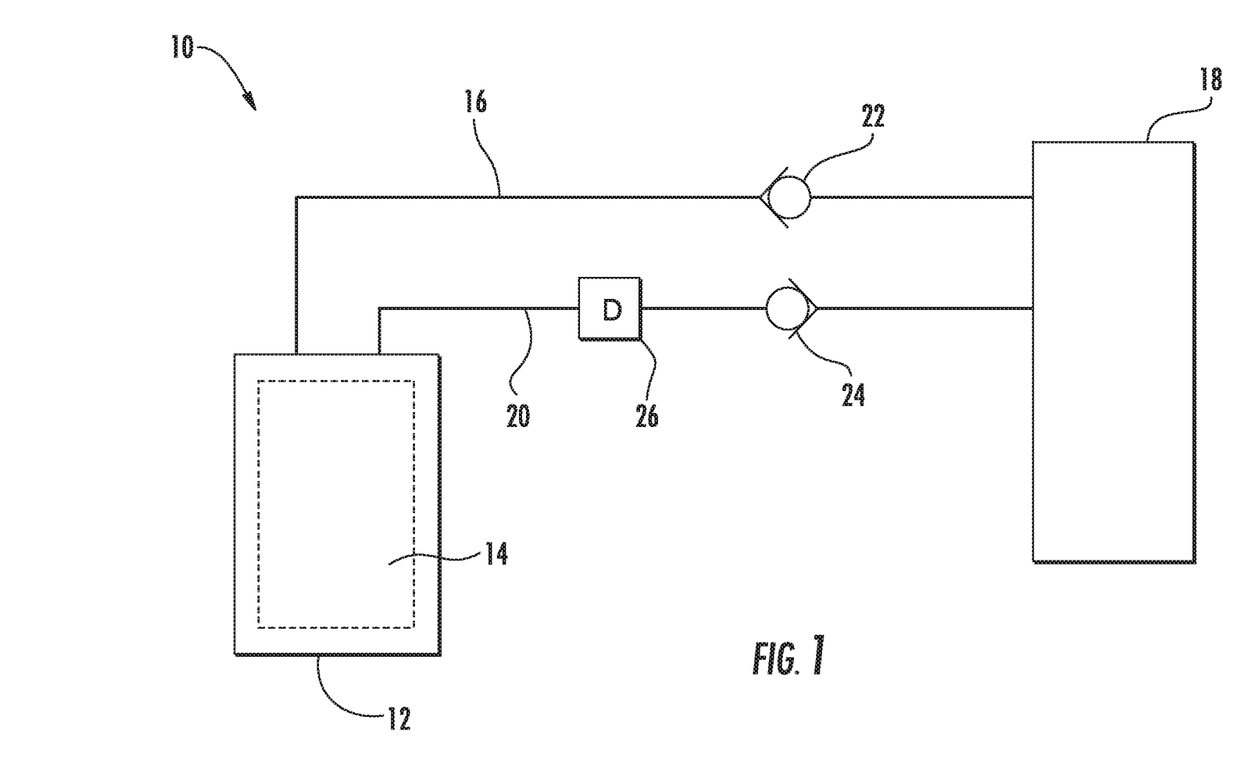
FIG. 1 is a schematic representation of a window system in one exemplary embodiment.

FIG. 1 schematically illustrates a window system 10 including a window 12 having an internal window cavity 14 with air disposed therein. The window 12 is disposed in an enclosure that is subjected to air pressure changes, such as an aerospace vehicle. The window system 10 further includes a first path 16 which extends from the window cavity 14 to an interior 18 of the enclosure. The system 10 additionally includes a second path 20 which similarly extends from the window cavity 14 to the interior 18 of the enclosure.

The first and second paths 16 and 20 of the system 10 are configured to allow airflow between the window cavity 14 and the interior 18 of the enclosure. The first and second paths 16 and 20 respectively include flow control elements 22 and 24 which regulate airflow within the paths 16 and 20. In this exemplary embodiment, the flow control element 22 disposed within the first path 16 is a one way valve which allows air to flow from the window cavity 14 to the interior 18 of the enclosure, but which prohibits airflow in the opposite direction, i.e., from the interior 18 to the window cavity 14. Oppositely, the flow control element 24 disposed in the second path is a one way valve which allows air to flow from the interior 18 to the window cavity 14, but which prohibits airflow from the cavity 14 in the direction of enclosure interior 18.

A drying agent 26 is disposed in the second path 20 and is arranged such that all air moving from the interior 18 of the enclosure toward the window cavity 14 is subjected thereto. The drying agent 26 can be any source capable of reducing moisture in the airflow within the second path 20. In one illustrative embodiment, the drying agent 26 comprises desiccant material, for example, arranged in a container through which the air in the second path 20 passes. A silica gel or similar desiccant material can be used. The drying agent 26 is arranged in the second path 20 between the window cavity 14 and the one way valve 24. In this way, ambient air within the interior 18 of the enclosure does not contact the drying agent 16. To the contrary, only air moving through the second path 20 toward the window cavity 14 comes into contact with the drying agent 26. This ensures that the drying agent 26 is preserved only for this incoming air, thus prevent unnecessary depletion of the drying agent 26 through contact with the ambient air of the interior 18 of the enclosure.

In operation, when the enclosure is subjected to a decrease in pressure, a pressure gradient forms between the interior 18 and the window cavity 14. Some of the air at higher pressure within the window cavity 14 is drawn out and is directed through the first path 16 toward the interior 18, which is at lower pressure. This air passes through the flow control element 22 and enters the interior 18 of the enclosure, thus equilibrating the pressures in the window cavity 14 and in the interior 18.

When the enclosure is subjected to an increase in pressure, the air within the interior 18 expands. To equalize pressure between the window cavity 14 and the interior 18, some of this expanding air migrates into the second path and travels toward the cavity 14. The expanding air is prevented from entering the first path 16 due to the flow control element 22, as discussed above. Instead, the air enters the second path 20 and is first directed through the flow control element 24, which prohibits the air from returning to the interior 18 of the enclosure. The air in the second path 20 is then directed through the drying agent 26 which reduces a moisture content of the air. For example, where the drying agent 26 comprises a desiccant material, such material absorbs water from the air which may have been accumulated in the interior 18, such that after passing through the drying agent 26, the air progressing toward the window cavity 14 is drier than when it entered the second path 20. As a result, the air which fills the window cavity 14 creates a lower absolute humidity within the space, thus lowering the dew point and hence inhibiting the formation of frost or fog upon interior elements of the window, such as panes, etc.

In one example, the enclosure is an aerospace vehicle, such as a passenger aircraft, and the interior 18 is the passenger cabin. Such an aircraft includes a plurality of windows, each of which perhaps include multiple panes and a window reveal secured over the window. One or more of the cavities 14 may be delimited between the window panes and/or the reveal. Air within these cavities 14 is in communication through the first and second paths 16 and 20 with the interior cabin 18. This is necessary to allow for pressure regularization during flight between the air within the cavities 14 and the air within the cabin 18. As the aircraft ascends, air pressure within the cabin 18 is reduced and air is drawn from the window cavities through the first path 16 into the cabin 18 in order to equalize pressure. Similarly, when the aircraft descends, air pressure in the cabin 18 increases and the expanding cabin air is directed through the second path 20 into the window cavities 14. As discussed above, the flow control elements 22 and 24 prevent cabin air from entering the first path 16 and prevent cavity air from entering the second path 20.

During flight, the moisture level of the air within the cabin 18 can increase due to the number and/or activities of passengers. Additionally, some aircraft have humidifiers, showers, or other components which may introduce moisture into the cabin air. If unchecked, this moisture laden air could enter the window cavity, raise the absolute humidity therein, thus raising the dew point above the temperature of the window panes which have been cooled during flight by the very low external temperatures. The result would be the formation of condensation on the window surfaces in the form of fog and/or frost. However, the window system 10 ensures that air entering the window cavity 14 through the second path is thus required to pass through the drying agent 26 which, as explained above, removes moisture from the inbound air thus lowering the humidity and the dew point within the cavity 14, hence preventing condensation.

Figure 2:
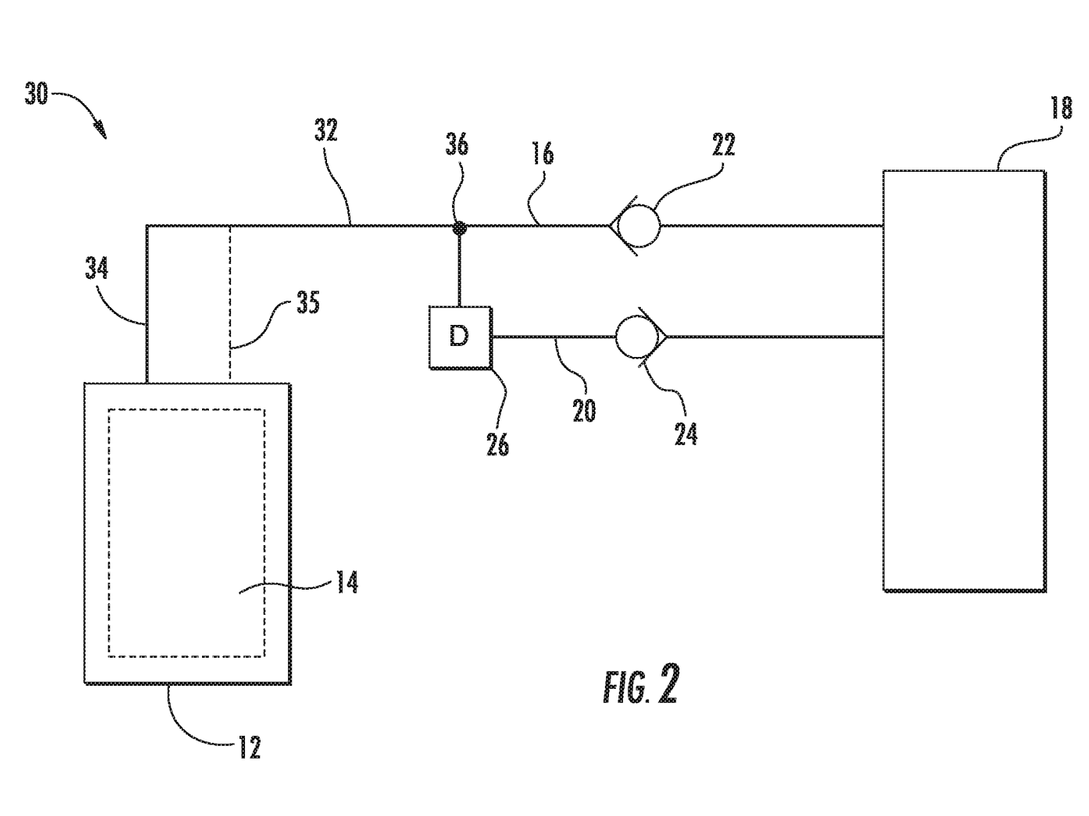
FIG. 2 is a schematic representation of a window system in another exemplary embodiment.

FIG. 2 shows a window system 30 in another embodiment, where elements similar to those of other embodiments are shown with consistent reference numerals and for purposes of brevity are not specifically reintroduced herein. Different from the window system 10 discussed above, the system 30 further includes a third path 32 which is disposed between the window 12 on the one hand, and the first and second paths 16 and 20 on the other hand. The system 30 further includes a connector 34 which connects the third path 32 with the window cavity 14 and a junction 36 which connects the third path 32 with the first and second paths 16 and 20.

The third path 32 and the connector 34 establish a shared conduit through which air entering and exiting the window cavity 14 passes. That is, when air pressure within the enclosure decreases (for example during ascent of an aircraft), air is drawn out of the window cavity 14, through the connector 34, the third path 32, and the junction 36, into the first path 16, and ultimately through the flow control element 22 and into the interior 18 of the enclosure. Similarly, when air pressure within the enclosure increases, air from the interior 18 is directed into the second path 20, through the flow control element 24 and drying agent 26 as discussed above, through the junction 36, into the third path 32, through the connector 34, and ultimately into the window cavity 14. The result of the system 30, as in the system 10, is that the air entering the cavity 14, which originates from the second path 20 and travels through the third path 32 and through the connector 34, is dried by the drying agent 26 so that the humidity within the cavity is reduced and condensation is averted.

The window system 30 can optionally include one or more additional connectors 35 (shown phantom in FIG. 2) which is configured to allow airflow into and out of the window cavity 14 in the same way as the connector 34. This additional connector 35 adds redundancy to the system 30 in case there is a blockage in or other malfunction with the connector 34.

Figure 3:
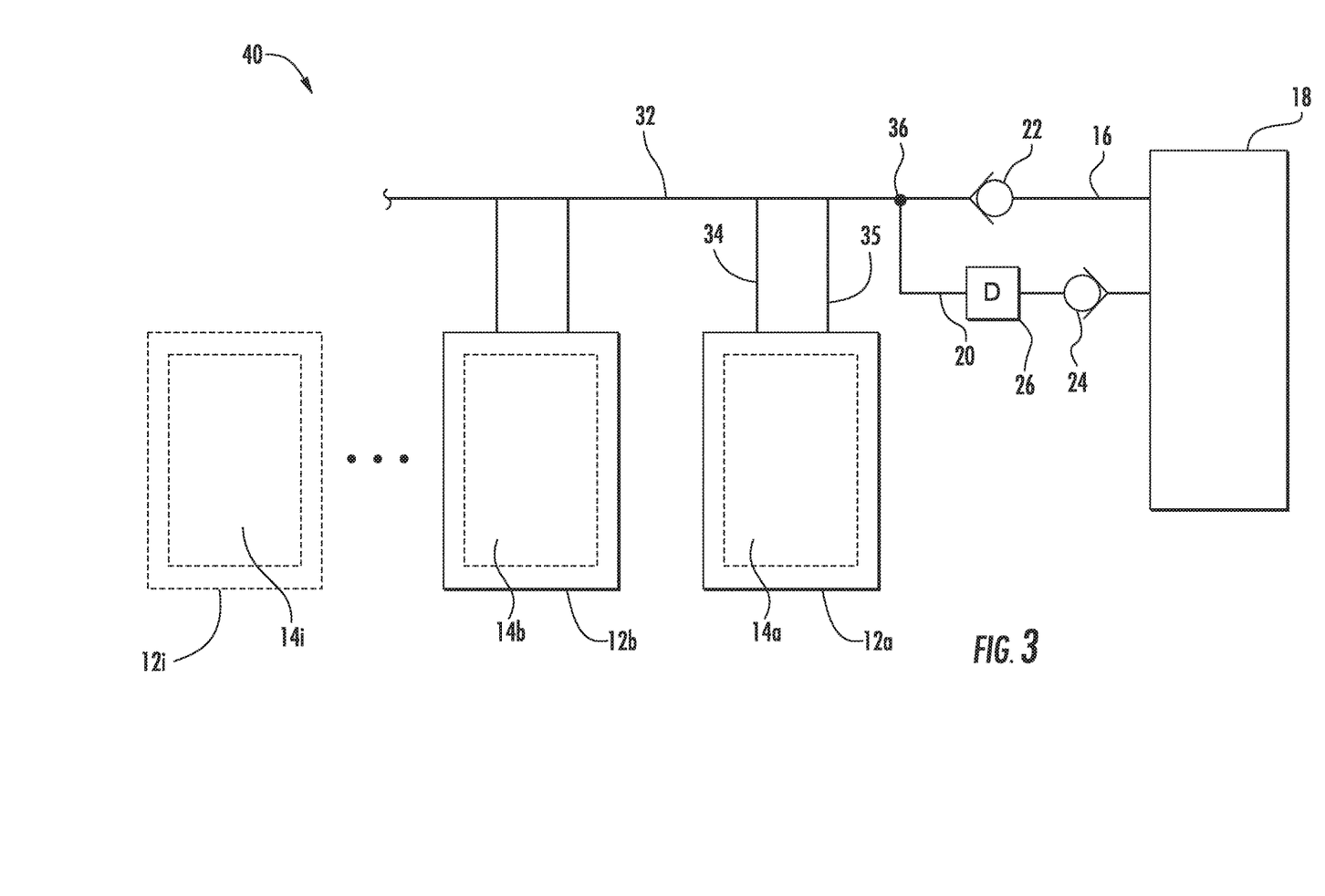
FIG. 3 is a schematic representation of a window system in another exemplary embodiment.

FIG. 3 illustrates another alternative embodiment of the window system generally indicated at reference numeral 40. Herein again, elements in FIG. 3 which are similar to those of other embodiments are designated with consistent reference numerals and, for purposes of brevity, are not specifically reintroduced herein. The system 40 is similar to the system 30 but differs in that it includes a plurality of windows 12a, 12b, . . . 12i, each including respective window cavities 14a, 14b, . . . 14i. As such, the third path 32 extends adjacent to the plurality of windows 12a, 12b, . . . 12i, and is connected to each by respective connectors 34a, 35a, 34b, 35b, . . . 34i, 35i. The connectors 35 are identical to and redundant of the connectors 34, as discussed above. The third path 32 connects with the first and second paths 16 and 20 at the junction 36. Each of the first and second paths 16 and 20 are disposed in communication with the interior 18 of the respective enclosure, as discussed above.

Accordingly, in the case of an aircraft having the interior cabin 18 and the plurality of windows 12a, 12b, . . . 12i, a window system 30 may be installed on both sides of the fuselage so as to serve the window cavities 14a, 14b, . . . 14i on the left side of the aircraft and on the right side. The two systems 40 may be separate or fluidly connected through, for example, a conduit extending through the ceiling of the passenger cabin. In either instance, the window system 40 operates similarly to that of systems 10 and 30. That is, as air pressure within the cabin 18 decreases, for example during aircraft ascent, air is drawn from the window cavities 14a, 14b, . . . 14i through the connectors 34, 35, into the third path 32, through the junction 36, and ultimately into the first path 16 and into the cabin 18 in order to equalize pressure within the aircraft. Similarly, when the aircraft descends, air pressure in the cabin 18 increases and the expanding cabin air is directed into the second path 20, through the junction 36, and through the third path 32 and the connectors 34, 35, and ultimately into the window cavities 14. As discussed above, the flow control elements 22 and 24 prevent cabin air from entering the first path 16 and prevent cavity air from entering the second path 20. Also, as with the previous embodiments, the drying agent 26 ensures that air entering the window cavities 14a, 14b, . . . 14i is not overly moist, thus inhibiting condensation.

Figure 4:
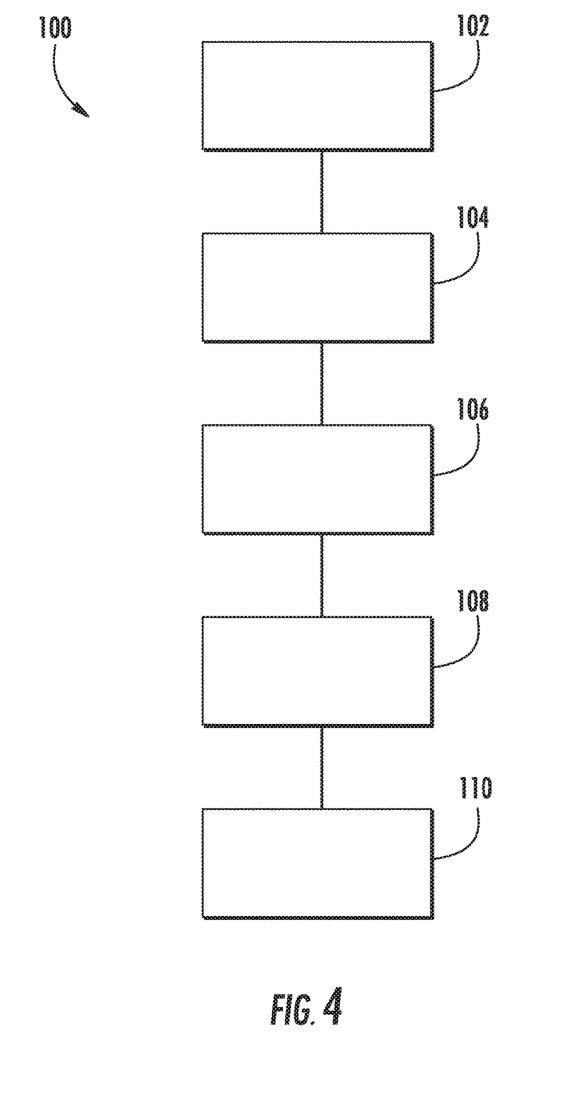
FIG. 4 is a flowchart illustrating an exemplary method for venting a window cavity.

FIG. 4 illustrates an exemplary method for venting a window cavity of an enclosure subjected to a change in air pressure, in accordance with the present disclosure. Therein, at a first step 102, air from within the cavity is directed out of the cavity through a first path and to an interior of the enclosure during a decrease in air pressure within the enclosure. At a second step 104, airflow is directed from the interior of the enclosure, through a second path, back into the cavity during an increase in air pressure within the enclosure. At 106, moisture is removed from the airflow in the second path which is flowing back to the cavity. This moisture removal may be performed by passing the air in the second path through a drying agent, such as through a desiccant cartridge. At 108, airflow from the interior of the enclosure, through the first path, and into the cavity is prohibited. While at item 110, airflow from the cavity through the second path to the interior of the enclosure is prohibited. That is, these steps of the method ensure that only outgoing air (from the cavity to the interior of the enclosure) passes through the first path and that only incoming air (from the interior to the cavity) passes through the second path. In an exemplary embodiment, these prohibitions are accomplished by disposing flow control elements, such as one way valves, in the first and second paths. Although steps 104 through 110 are shown independently for ease of explanation, it is to be understood that these steps may be performed simultaneously, or in relatively quick succession. For example, as airflow is directed through the second path from the enclosure to the cavity as described at step 104, the moisture in the airflow is being removed by the drying agent as described at step 106.

Figure 5:
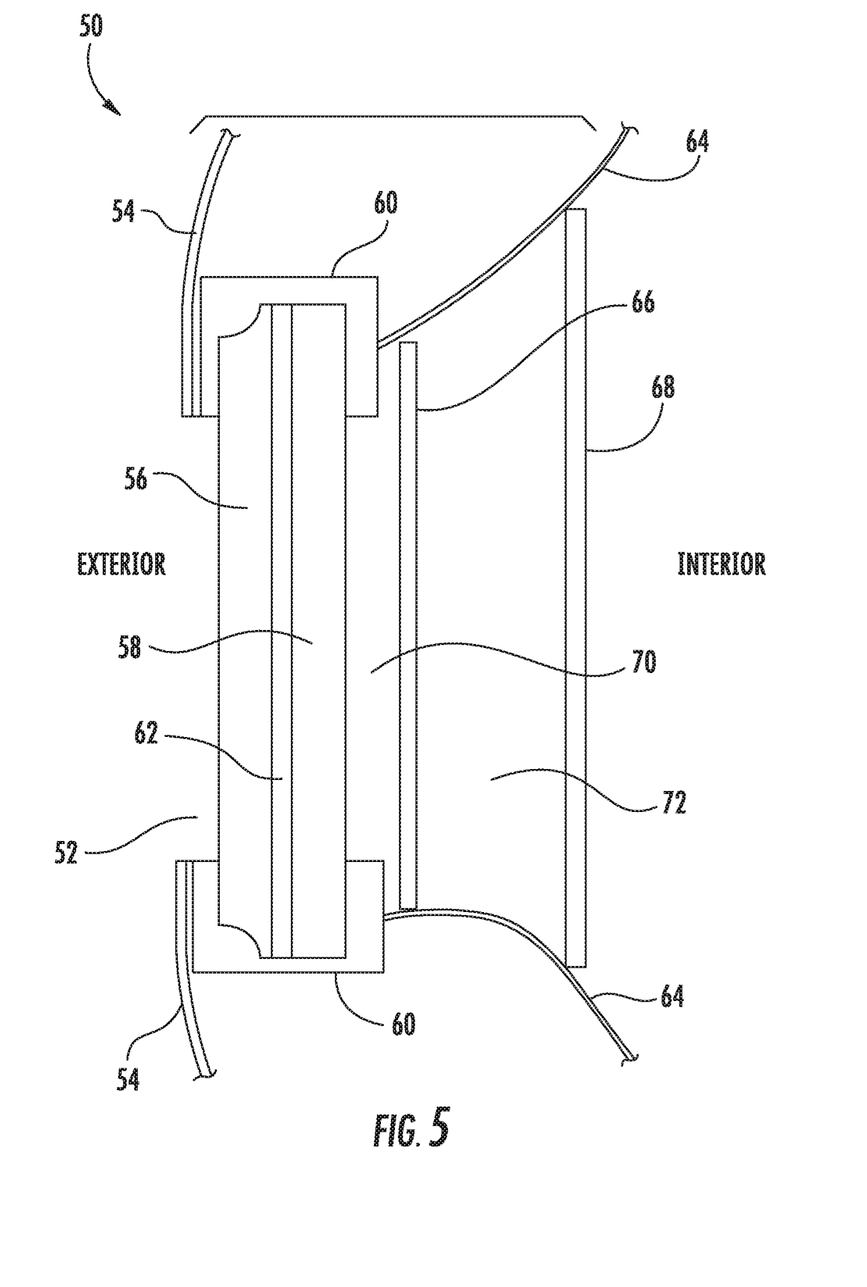
FIG. 5 is a cross-sectional representation of an exemplary window arrangement to which the present invention may be applicable.

The window system according to the invention has been thus far schematically illustrated. As mentioned, the present window system may be disposed in any enclosure that experiences pressure differentials. FIG. 5 illustrates an exemplary window arrangement 50, in cross-section, disposed in an aerospace vehicle such as a commercial airplane. The window arrangement comprises an opening 52 formed through the airplane frame 54. An outer structural pane 56 and an inner structural pane 58 are disposed in the opening 52 and are secured to the frame 54 by retainer clips 60. A first gap 62 may be formed between the outer and inner structural panes 56, 58. (Alternatively, this space may be filled by an interlayer.)

On the interior side of the window arrangement 50, a window reveal 64 extends inwardly toward the passenger compartment. A first completion pane 66 is disposed within the window reveal 64 proximate to the inner structural pane 58. A second completion pane 68 is disposed within the window reveal 64 and is arranged distally from the inner structural pane 58 and closer to the passenger compartment than is the first completion pane 66. A second gap 70 is delimited by the inner structural pane 58 and the first completion pane 66. A third gap 72 is formed between the first and second completion panes 66, 68.

The cavity 18, discussed hereinabove, can be formed by one or more of the first, second, and third gaps 62, 70, and 72. That is, referring now to FIGS. 1 and 5, the first and second paths 16 and 20 may be disposed in communication with one or more of the gaps 62, 70, and 72. This allows air within the gaps 62, 70, and 72 to migrate out of the window arrangement 50 and into the passenger compartment of the airplane during a reduction in internal air pressure. Similarly, air is permitted to return to the gaps 62, 70, and 72 through the second path 20 during instances of increasing cabin pressure. Importantly, all air entering the gaps 62, 70, and 72 must pass through the drying agent 26 disposed in the second path 20. This ensures that the moisture content in the incoming air is reduced to an acceptable level whereby the formation of condensation is minimized on the inner structural pane 58, the first completion pane 66, and the second completion pane 68. In this exemplary embodiment, the first and second paths 16 and 20 may be formed by tubing or piping disposed within the frame 54 of the aircraft.

The window systems 10, 30, and 40 are described herein as forming a part of an enclosure which is subjected to a change in air pressure. The enclosure is described illustratively as being an aerospace vehicle, and particularly the passenger cabin of an aircraft. This of course is merely exemplary. The enclosure can be any aerospace vehicle such as any aircraft including helicopters, other rotorcraft, airships, aerostats, or alternatively, any spacecraft. Still further, the enclosure may comprise an undersea vehicle or a high-rise elevator, or the like, which experiences air pressure changes.

The various paths, junctions, and connectors can take any form suitable for directing the airflow as described herein. For example, plastic tubing may be used, such as that commonly sold under the trademark TYGON.

The drying agent 26 discussed herein can take any form suitable for removing moisture content from air travelling toward the window cavities. As mentioned, the drying agent may comprise a desiccant arrangement, such as a desiccant cartridge including any desired desiccant material including but not limited to silica, activated charcoal, calcium sulfate, calcium chloride, molecular sieves, zeolites, etc. The drying agent 26 is generally placed within an area of the window system 10, 20, 40 or enclosure 18 that is hidden, but relatively easily accessible. Accordingly, the drying agent 26 can be accessed and replaced when performing routine maintenance or other repair procedures.

The flow control elements 22, 24 are described herein by way of example as being one way valves. This is merely illustrative. The flow control elements can be any element sufficient for controlling the direction of airflow in a conduit. Herein, the flow control elements are arranged such that airflow may only enter the airflow cavities after passing through the drying agent. As discussed, this advantageously ensures that the moisture content of the incoming air is reduced, thus resulting inhibiting the formation of condensation within the cavity.

The window system is described herein as including a single first path 16 through which air from the window cavity 14 enters the enclosure 18, and as further including a single second path 20 through which air entering the window cavity 14 passes. The presence of distinct ingress and egress pathways is advantageous in that the drying agent is only expensed on the incoming air and is not spent unnecessarily on outgoing air. However, in another embodiment, the window system may include a plurality of first paths and/or a plurality of second paths. That is, multiple outgoing pathways from the window cavity to the interior of the enclosure are possible. Similarly, multiple incoming pathways from the interior to the window cavity are possible. For example, in FIG. 1, additional paths 16 and 20 may be added, extending directly from the interior 18 to the window cavity 14. In FIGS. 2 and 3, additional paths 16 and 20 may be added as desired, extending from the interior 18 to the junction 36. Each of the plurality of paths 16, 20 can include the flow control valves, as discussed herein. Similarly, each of the paths 20 may include an additional drying agent 26 in order to enhance moisture removal.

The window system provided herein is a passive system which does not require an external source of power. The system is driven entirely by air pressure changes within the enclosure in which the system is disposed. This results in a simplistic window system that has very low operating costs, which consumes no power, emits no heat or other byproducts, presents no safety hazard, is lightweight and easy to maintain, and is effective at reducing condensation in the window cavities.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. An aircraft comprising a window system subjected to a change in air pressure, the aircraft including a window having an air-filled cavity, the system comprising:
    a first path configured to allow air within the cavity of the window to vent out of the cavity;
    a second path configured to allow air to flow into the cavity; and
    a drying agent disposed within the second path;
    wherein moisture in the air entering the window cavity through the second path is reduced by the drying agent, the first path includes a flow control element which permits airflow out of the system and prohibits airflow into the system, the second path includes a flow control element which permits airflow into the system and prohibits airflow out of the system.

2. The aircraft of claim 1, wherein the flow control elements comprise one-way valves.

3. The aircraft of claim 1, wherein the drying agent comprises a desiccant material.

4. The aircraft of claim 1, further comprising:
    a third path disposed between the window cavity and the first and second paths;
    a junction disposed at an interface where the third path connects with the first and second paths; and
    a connection to the window cavity disposed on the third path opposite from the junction;
    wherein the third path is configured to allow airflow into the window cavity and out of the window cavity.

5. The aircraft of claim 4, wherein the connection comprises a first conduit and a second conduit separate from the first, wherein the first and second conduits extend from the third path to the window cavity and are configured to allow airflow into the window cavity and out of the window cavity.

6. The aircraft of claim 4, wherein the first path includes a one-way valve which permits airflow out of the system and prohibits airflow into the system and wherein the second path includes a one-way valve which permits airflow into the system and prohibits airflow out of the system.

7. The aircraft of claim 4, including a plurality of said windows each having said window cavity, wherein the third path extends through an outer wall of the aircraft past the plurality of windows, and wherein the connection comprises a conduit extending from each of the window cavities to the third path.

8. The aircraft of claim 7, wherein the first path includes a one-way valve which permits airflow out of the system and prohibits airflow into the system and wherein the second path includes a one-way valve which permits airflow into the system and prohibits airflow out of the system.

9. The aircraft of claim 1, wherein the first path is configured to allow air within the cavity of the window to vent out of the cavity when air pressure within the aircraft decreases, and wherein the second path is configured to allow air to flow into the cavity when the air pressure in the aircraft increases.

10. The aircraft of claim 9, wherein the first path is further configured to prevent airflow out of the window cavity from entering the drying agent and wherein the second path is further configured to direct all airflow into the cavity to pass through the drying agent.

11. The aircraft of claim 10, wherein the drying agent comprises a desiccant material configured to remove moisture from the airflow into the cavity and to lower the absolute humidity and dew point thereof.

12. A method for venting a window cavity of an enclosure subjected to a change in air pressure, the method comprising:
    directing airflow through a first path out of the cavity during a decrease in air pressure within the enclosure;
    directing airflow through a second path into the cavity during an increase in air pressure within the enclosure;
    causing moisture to be removed from the airflow in the second path;
    directing the airflow out of the window cavity and the airflow into the window cavity through a third path extending between the window cavity and the first and second paths;
    prohibiting airflow into the window cavity through the first path; and
    prohibiting airflow out of the window cavity through the second path;
    wherein the enclosure comprises an aircraft;
    wherein the decrease in air pressure within the aircraft coincides with an increase in an altitude of the aircraft; and
    wherein the increase in air pressure within the aircraft coincides with a decrease in the altitude of the aircraft.

* * * * *